(12) United States Patent
Perez et al.

(10) Patent No.: US 11,461,613 B2
(45) Date of Patent: Oct. 4, 2022

(54) METHOD AND APPARATUS FOR MULTI-DOCUMENT QUESTION ANSWERING

(71) Applicant: NAVER CORPORATION, Gyeonggi-do (KR)

(72) Inventors: Julien Perez, Grenoble (FR); Arnaud Sors, Grenoble (FR)

(73) Assignee: NAVER CORPORATION, Gyeonggi-Do (KR)

( * ) Notice: Subject to any disclaimer, the term of this patent is extended or adjusted under 35 U.S.C. 154(b) by 474 days.

(21) Appl. No.: 16/704,512

(22) Filed: Dec. 5, 2019

(65) Prior Publication Data

US 2021/0174161 A1    Jun. 10, 2021

(51) Int. Cl.
*G06N 3/00* (2006.01)
*G06N 3/08* (2006.01)
*G06N 3/04* (2006.01)
*G06F 16/93* (2019.01)
*G06F 16/953* (2019.01)

(52) U.S. Cl.
CPC ............ *G06N 3/004* (2013.01); *G06F 16/93* (2019.01); *G06F 16/953* (2019.01); *G06N 3/0427* (2013.01); *G06N 3/0445* (2013.01); *G06N 3/0454* (2013.01); *G06N 3/0472* (2013.01); *G06N 3/08* (2013.01)

(58) Field of Classification Search
CPC .. G06N 3/0472; G06N 3/0445; G06N 3/0454; G06N 3/08; G06N 3/004; G06N 3/0427; G06N 5/04; G06F 16/93; G06F 16/953; G06F 16/3329
See application file for complete search history.

(56) References Cited

U.S. PATENT DOCUMENTS

| | | | |
|---|---|---|---|
| 2020/0226410 A1* | 7/2020 | Liu | G06V 20/30 |
| 2021/0065041 A1* | 3/2021 | Gopalan | G06N 3/084 |
| 2021/0125108 A1* | 4/2021 | Metzler, Jr. | G06F 16/93 |

OTHER PUBLICATIONS

A. Conneau, D. Kiela, H. Schwenk, et al.; "Supervised Learning of Universal Sentence Representations from Natural Language Inference Data;" Facebook AI Research and Lium, Université Le Mans, submitted to arXiv on May 5, 2017 (arXiv reference arXiv: 1705.02364).

(Continued)

*Primary Examiner* — Etienne P Leroux (57) ABSTRACT

A computer implemented method for multi-document question answering is performed on a server communicating with a client device over a network. The method includes receiving a runtime question from a client device and retrieving runtime documents concerning the runtime question using a search engine. Runtime answer samples are identified in the retrieved runtime documents. A neural network model, trained using distant supervision and distance based ranking loss, is used to compute runtime scores from runtime question data representing the runtime question and from a runtime answer sample representing a first portion of text from the corpus of documents, where each runtime score represents a probability an answer to the runtime question is present in the runtime answer samples. A runtime answer is selected from the runtime answer samples corresponding to the highest runtime score sent to the client device.

20 Claims, 4 Drawing Sheets

(56) References Cited

OTHER PUBLICATIONS

A. Gordo, J. Almazan, J. Revaud, and D. Larlus; "Deep Image Retrieval: Learning Global Representations for Image Search;" Springer International Publishing AG, pp. 241-257, 2016.

A. Radford, K. Narasimhan, T. Salimans, et al.; "Improving Language Understanding by Generative Pre-Training;" Open AI; submitted as a preprint, pp. 1-12, 2018.

B. Hu, Z. Lu, H. Li, et al.; "Convolutional Neural Network Architectures for Matching Natural Language Sentences;" Department of Computer Science & Technology—Harbin Institute of Technology and Noah's Ark Lab—Huawei Technologies Co. Ltd., submitted to arXiv on Mar. 11, 2015 (arXiv reference arXiv: 1503.03244).

B. Mitra and N. Craswell; "Neural Models for Information Retrieval;" Microsoft, UCL—Cambridge and Microsoft—Bellevue; submitted to arXiv on May 3, 2017 (arXiv reference arXiv: 1705.01509).

C. Clark, M. Gardner; "Simple and Effective Multi-Paragraph Reading Comprehension;" University of Washington and Allen Institute for Artificial Intelligence, submitted to arXiv on Nov. 7, 2017 (arXiv reference arXiv: 1710.10723v2).

C-Y. Wu, R. Manmatha, A. Smola, et al.; "Sampling Matters in Deep Embedding Learning;" UT-Austin, A9/Amazon, Amazon; published as an Open Access version by the Computer Vision Foundation, pp. 2840-2848, 2017.

D. Chen, A. Fisch, J. Weston, et al.; "Reading Wikipedia to Answer Open-Domain Questions;" Computer Science—Stanford University and Facebook AI Research; submitted to arXiv.org on Apr. 28, 2017 (arXiv reference arXiv: 1704.00051v2).

E. Choi, D. Hewlett, J. Uszkoreit, et al.; "Coarse-to-Fine Question Answering for Long Documents;" Association for Computational Linguistics, proceedings of the 55th Annual Meeting of the Association for Computational Linguistics, pp. 209-220, 2017.

F. Schroff, D. Kalenichenko, J. Philbin; "FaceNet: A Unified Embedding for Face Recognition and Clustering;" Google Inc.; published as an Open Access version by the Computer Vision Foundation, pp. 815-823, 2015.

H. Song, Y. Xiang, S. Jegelka, et al.; "Deep Metric Learning via Lifted Structured Feature Embedding;" Stanford University and MIT, published as an Open Access version by the Computer Vision Foundation, pp. 4004-4012, 2016.

H-Y. Huang, C. Zhu, Y. Shen, et al.; "FusionNet: Fusing via Fully-Aware Attention with Application to Machine Comprehension;" Microsoft Business AI and Research and National Taiwan University, submitted to arXiv on Nov. 16, 2017 (arXiv reference arXiv: 1711.07341).

J. Devlin, M-W. Chang, K. Lee, et al.; "BERT: Pre-training of Deep Bidirectional Transformers for Language Understanding;" Google AI Language, submitted to arXiv on Oct. 11, 2018 (arXiv reference arXiv: 1810.04805).

J. Wieting, M. Bansal, K. Gimpel, et al.; "Towards Universal Paraphrastic Sentence Embeddings;" Toyota Technological Institute at Chicago, submitted to arXiv on Nov. 25, 2016 (arXiv reference arXiv: 1511.08198).

K. Cho, B. Merriënboer, C. Gulcehre, et al.; "Learning Phrase Representations using RNN Encoder-Decoder for Statistical Machine Translation;" submitted to arXiv.org on Sep. 3, 2014 (arXiv reference arXiv: 1406.1078v3).

L. Pang, Y. Lan, J. Guo, et al.; "Text Matching as Image Recognition;" CAS Key Laboratory of Network Data Science and Technology, Institute of Computing Technology, Chinese Academy of Sciences; Published in the Association for the Advancement of Artificial Intelligence, pp. 2793-2799, 2016.

L. Yang, Q. Ai, J. Guo, et al.; "aNMM: Ranking Short Answer Texts with Attention-Based Neural Matching Model;" Center for Intelligent Information Retrieval—University of Massachusetts, CAS Key Lab of Network Data Science and Technology—Institute of Computing Technology; published by CIKM, pp. 287-296, 2016.

M. Elbayad, L. Besacier, J. Verbeek; "Pervasive Attention: 2D Convolutional Neural Networks for Sequence-to-Sequence Prediction;" submitted to arXiv on Aug. 11, 2018 (arXiv reference arXiv: 1808.03867).

M. Geva, J. Berant; "Learning to Search in Long Documents Using Document Structure;" Tel Aviv University, submitted to arXiv on Jun. 9, 2018 (arXiv reference arXiv: 1806.03529).

M. Hu, F. Wei, Y. Peng, et al.; "Read + Verify: Machine Reading Comprehension with Unanswerable Questions;" College of Computer—National University of Defense Technology and Microsoft Research Asia, published on arXiv as a preprint on Aug. 17, 2018 (arXiv reference arXiv: 1808.05759).

M. Hu, Y. Peng, Z. Huang, et al.; "Reinforced Mnemonic Reader for Machine Reading Comprehension;" College of Computer—National University of Defense Technology, School of Computer Science—Fudan University, and Microsoft Research, submitted to arXiv on Apr. 25, 2018 (arXiv reference arXiv: 1705.02798v4).

M. Peters, M. Neumann, M. Iyyer, et al.; "Deep contextualized word representations;" Allen Institute for Artificial Intelligence and Paul G. Allen School of Computer Science and Engineering, University of Washington; submitted to arXiv on Feb. 15, 2018 (arXiv reference arXiv: 1802.05365).

M. Seo, A. Kembhavi, A. Farhadi, et al.; "Bi-Directional Attention Flow For Machine Comprehension;" University of Washington, Allen Institute for Artificial Intelligence, submitted to arXiv on Nov. 5, 2016 (arXiv reference arXiv: 1611.01603).

M. Seo, T. Kwiatkowski, A. Parikh, et al.; "Phrase-Indexed Question Answering: A New Challenge for Scalable Document Comprehension;" Google Research, Clova AI Research, University of Washington, Allen Institute for AI, XNOR.AI; submitted to arXiv on Apr. 20, 2018 (arXiv reference arXiv: 1804.07726).

O. Levy, M. Seo, E. Choi, et al.; "Zero-Shot Relation Extraction via Reading Comprehension;" Allen School of Computer Science and Engineering—University of Washington and Allen Institute for Artificial Intelligence—Seattle, Washington, submitted to arXiv on Jun. 13, 2017 (arXiv reference: arXiv: 1706.04115).

P. Bojanowski, E. Grave, A. Joulin, et al.; "Enriching Word Vectors with Subword Information;" Facebook AI Research, submitted to arXiv.org on Jul. 15, 2016 (arXiv reference arXiv: 1607.04606).

S. Arora, Y. Liang, T. Ma; "A Simple But Tough-To-Beat Baseline For Sentence Embeddings;" Princeton University; published as a conference paper at ICLR, pp. 1-16, 2017.

S. Bowman, G. Angeli, C. Potts, et al.; "A large annotated corpus for learning natural language inference;" Linguistics—Stanford University, NLP Group—Stanford University and Computer Science—Stanford University; submitted to arXiv.org on Aug. 21, 2015 (arXiv reference arXiv:1508.05326).

S. Iyer, N. Dandekar, and K. Csernai; "First Quora Dataset Release: Question Pairs;" Data Science Team at Quora, Jan. 24, 2017.

S. Kim, J-H. Hong, I. Kang, et al.; "Semantic Sentence Making with Densely-connected Recurrent and Co-attentive Information;" Naver Corporation, Seoul National University, and Gwangju Institute of Science and Technology; Published on arXiv as a preprint on May 29, 2018 (arXiv reference arXiv: 1805.11360).

S. Wang, M. Yu, X. Guo, et al.; "R3: Reinforced Ranker-Reader for Open-Domain Question Answering;" School of Information System—Singapore Management University, AI Foundations, jd.com—Beijing; submitted to arXiv on Nov. 21, 2017 (arXiv reference arXiv: 1709.00023v2).

W. Wang, N. Yang, F. Wei, et al.; "Gated Self-Matching Networks for Reading Comprehension and Question Answering;" Key Laboratory of Computational Linguistics—Peking University, Microsoft Research—Beijing, Collaborative Innovation Center for Language Ability—Xuzhou; published by the Association for Computational Linguistics, pp. 189-198, 2017.

W. Yin, H. Schutze, B. Xiang, et al.; "ABCNN: Attention-Based Convolutional Neural Network for Modeling Sentence Pairs;" Center for Information and Language Processing—University of Munich, IBM Watson; submitted to arXiv on Dec. 16, 2015 (arXiv reference arXiv: 1512.05193).

Y. Wang, K. Liu, J. Liu, et al.; "Multi-Passage Machine Reading Comprehension with Cross-Passage Answer Verification;" Key Laboratory of Computational Linguistics—Peking University, Baidu Inc.—Beijing, submitted to arXiv on May 6, 2018 (arXiv reference arXiv: 1805.02220).

(56) References Cited

OTHER PUBLICATIONS

Z. Lu and H. Li; "A Deep Architecture for Matching Short Texts;" Noah's Ark Lab Huawei Technologies Co. Ltd; published in Proceedings of the 26th International Conference on Neural Information Processing Systems—vol. 1, pp. 1367-1375, 2013.

Z. Wang, W. Hamza, R. Florian; "Bilateral Multi-Perspective Matching for Natural Language Sentences;" IBM T.J. Watson Research Center, submitted to arXiv on Feb. 13, 2017 (arXiv reference arXiv: 1702.03814).

Z. Yang, P. Qi, S. Zhang, et al.; "HOTPOTQA: A Dataset for Diverse, Explainable Multi-hop Question Answering;" Carnegie Mellon University, Stanford University, Mila—University of Montreal, CIFAR Senior Fellow, Google AI; submitted to arXiv on Sep. 25, 2018 (arXiv reference arXiv: 1809.09600).

M. Jaderberg, K. Simonyan, A. Zisserman, et al.; "Spatial Transformer Networks;" Google DeepMind; published in Advances in neural information processing systems, pp. 2017-2025, 2015.

Martin Raison, Pierre-Emmanuel Mazare, Rajarshi Das, and Antoine Bordes; "Weaver: Deep Co-Encoding of Questions and Documents for Machine Reading;" submitted to arXiv.org on Apr. 27, 2018 (arXiv reference arXiv: 1804.10490).

P. Rajpurkar, J. Zhang, K. Lopyrev, and P. Liang; "Squad: 100,000+ Questions for Machine Comprehension of Text," Computer Science Department—Stanford University; Published on arXiv as preprint arXiv: 1606.05250, 2016.

R. Socher, E. H. Huang, J. Pennin, C. D. Manning, and A. Y. Ng; "Dynamic Pooling and Unfolding Recursive Autoencoders for Paraphrase Detection;" Computer Science Department and SLAC National Accelerator Laboratory—Stanford University published in Advances in neural information processing systems, pp. 801-809, 2011.

* cited by examiner

METHOD AND APPARATUS FOR MULTI-DOCUMENT QUESTION ANSWERING

FIELD

The field of the disclosure relates to machine reading, and more particularly multi-document question answering.

BACKGROUND

Machine reading consists of methods for allowing a computer program to read and comprehend human text in order to provide sensible output to a user.

Question-answering is a subtask of machine reading, and models designed for this purpose offer satisfactory performance on short passages of text when their goal is to locate the answer in a given passage. A drawback of these models is that they are trained using mono-document question answering datasets, which include a question, the text of the answer and its position in the document, and thus, are not suited for finding an answer in larger text corpora. Another drawback of these models is that they always give a location of the potential answer in a given passage; they therefore may identify a passage even when the passage does not contain the answer.

To solve these problems, the standard approach is to use a search engine, often called a retriever, to return passages that are potentially relevant to a question. Passages may be either documents (for example, a web page) or paragraphs of documents. Then a machine reading model (usually trained on single-passage question answering) is applied separately on each passage to obtain possible answers. However, from this approach two new problems result: (i) as machine reading models are trained on passages that always contain the answer, they always provide an answer even if the passage is irrelevant, in which case some proposed answers will not be sensible responses to original questions; and (ii) from all answers associated with the retrieved passages, an answer must be selected from among the proposed answers.

Another drawback of standard machine reading models is that when it comes to multi-document question answering, large-scale datasets with results from a search engine and ground truth about the position of the answer in the passage would be difficult to create. To overcome this problem, one possibility is to use questions from a mono-document question answering dataset such as SQuAD (which is described by P. Rajpurkar, J. Zhang, K. Lopyrev, and P. Liang, in "Squad: 100,000+ questions for machine comprehension of text," published on arXiv as preprint arXiv:1606.05250, 2016) with a search engine retrieving from the corpus that this dataset was built on (in the case of SQuAD, contents of a part of Wikipedia) such that each question may be associated with a ground truth document and answer position in the corpus. However, a significant proportion of SQuAD questions become ambiguous in a multi-document setting. For example, the question "Where was the main character born?" is ambiguous when taken out of context. This remark seems to be true for most mono-document datasets. Moreover, in the context of multi-document question answering annotating one position for the answer makes little sense, because when the search engine operates on a very large corpus such as the Internet, acceptable sentences that lead to the correct answer are likely to appear more than once.

There continues therefore to be a need for improved multi-document questioning methods using machine reading models.

SUMMARY

According to one aspect of the disclosed embodiments, a computer implemented method for multi-document question answering receives a runtime question at server from a client device, and retrieves documents concerning the runtime question using a search engine. In addition, the method identifies portions of text in the retrieved documents and computes a runtime score for the identified portions of text using the neural network model trained using distant supervision and distance based ranking loss. Further, the method selects the portions of text corresponding to the highest score to provide an answer, and sends from the server the answer to the client device.

According to another aspect of the disclosed embodiments, a computer implemented method trains a neural network model to compute a score representing a probability an answer to a predetermined question is present in a portion of text from a corpus of documents. The method includes: (a) computing a first training score using the neural network model from training question data representing a predetermined question and from a first training answer sample representing a first portion of text from the corpus of documents, where the first training answer sample is labelled as containing an answer to the predetermined question; (b) repeating (a) for a plurality of first training answer samples which have been respectively labelled as containing an answer to the predetermined question to compute a first set of training scores; (c) computing a second training score using the neural network model from the training question data and from a second training answer sample representing a second portion of text from the corpus of documents, where the second training answer sample is labelled as not containing an answer to the predetermined question; (d) repeating (c) for a plurality of second training answer samples which have been respectively labelled as not containing an answer to the predetermined question to compute a second set of training scores; (e) computing a loss using the first set of training scores and the second set of training scores by: (i) determining a minimum score among the first set of training scores; (ii) for each training score in second set of training scores, computing a training term that is a difference between the determined minimum score and each training score; and (iii) summing the training terms, wherein the loss is the sum of the training terms; and (f) updating the neural network model using the loss.

According to yet another aspect of the disclosed embodiments, a computer implemented method, performed on a server communicating with a client device over a network, receives a runtime question from a client device, and retrieves runtime documents concerning the runtime question using a search engine. In addition, the method identifies runtime answer samples in the retrieved runtime documents, and computes using a neural network model, trained using the preceding method, runtime scores from runtime question data representing the runtime question and from a runtime answer sample representing a first portion of text from the corpus of documents, where each runtime score represents a probability an answer to the runtime question is present in the runtime answer samples. Further, the method selects a runtime answer from the runtime answer samples corresponding to the highest runtime score, and sends the runtime answer to the client device.

BRIEF DESCRIPTION OF THE DRAWINGS

The drawings are only for purposes of illustrating various embodiments and are not to be construed as limiting, wherein.

In the drawings, reference numbers may be reused to identify similar and/or identical elements.

DETAILED DESCRIPTION

In accordance with the disclosure, a method for performing the machine reading task of question-answering of questions on multi-documents, also called open-domain, corpora. To this end, a neural network model is used to evaluate the probability that a given portion of text contains the answer to the question asked.

More specifically, the disclosure presents a method for training and using a neural network model for multi-document question answering that specifies the reading task in question answering as a retrieval task. This advantageously allows the retrieval score to be used as a confidence measure. The neural network model, trained using distant supervision and distance based ranking loss, combines an interaction matrix, Weaver blocks and adaptive subsampling to map to a fixed size representation vector, which is used to emit a score. The method presented here generally comprises these aspects: (i) learning parameters of the neural network model (i.e., a scoring model); and (ii) using the scoring model to determine the most relevant portion of text to answer a given question.

Advantageously, the disclosed method is thus able to learn from data that is not labelled for the desired task by combining a plurality of datasets through distant supervision. This allows the use of existing datasets and does not require the tedious task of labelling data from the training set to the particular problem.

A. System Architecture

Figure 1:
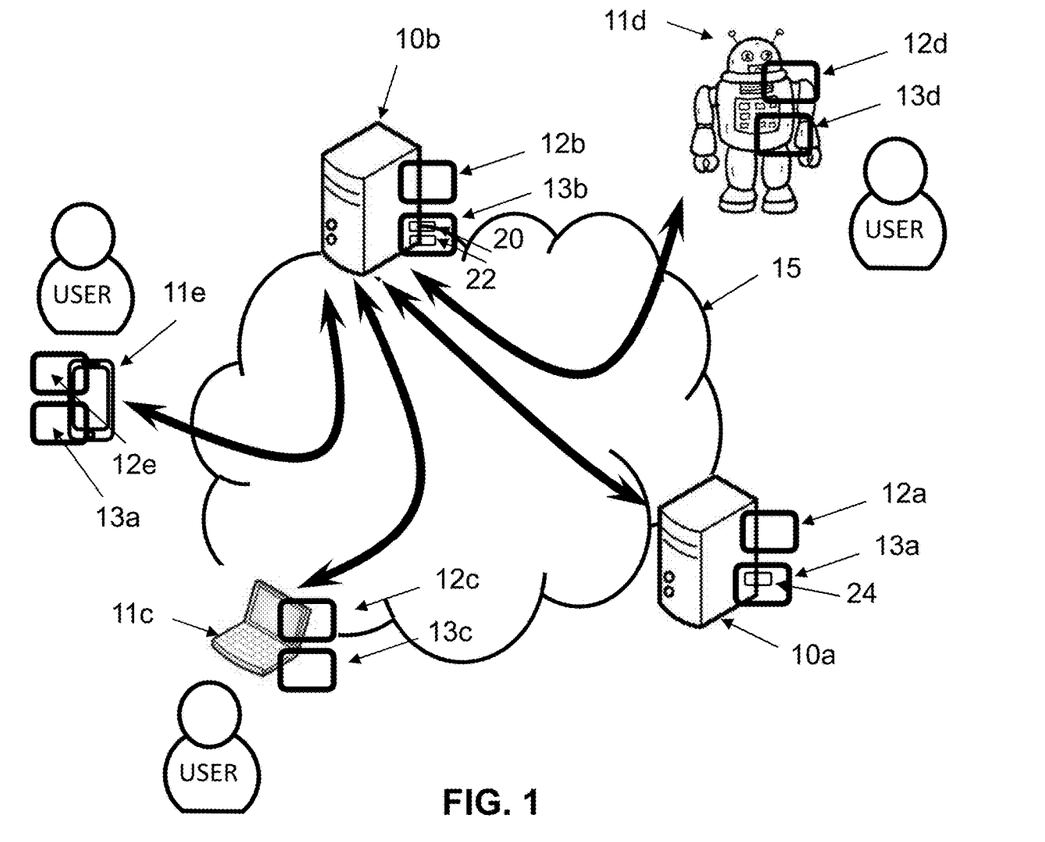
FIG. 1 illustrates an example of system architecture in which methods for multi-document question answering may be performed.

The above-mentioned aspects of learning and using may be implemented within a system architecture such as illustrated in FIG. 1 by means of a first server 10a and/or a second server 10b. In one embodiment, the first server 10a is the learning server (implementing the learning aspect) and the second server 10b is the scoring server (implementing the scoring aspect). In other embodiments, servers 10a and 10b may be merged or have reversed functionality.

The servers 10a and 10b are typically remote computer equipment connected to an extended network 15 such as the Internet for data exchange. The first server 10a stores or has access to at least one large scale text corpus 20, for example, contents of a part or all of a web-based encyclopedia, and at least one question and answer database 22, for example, the TriviaQA dataset.

The system architecture in FIG. 1 advantageously comprises one or more items of client equipment 11, which may be any workstation 11c, robot 11d, or mobile device 11e (which are also connected to network 15), preferably separate from the servers 10a, 10b but possibly being merged with one and/or the other thereof. Each server 10a, 10b and client equipment 11c, 11d, 11e comprises, respectively, data processing means 12a, 12b, 12c, 12d, 12e of processor type, and optionally storage means 13a, 13b, 13c, 13d, 13e such as a computer memory (e.g. a hard disk).

The client equipment 11 has one or more question for querying the large-scale text or corpus stored in the first server 10a to obtain answers thereto in an identified collection of documents. The operators (i.e., "users") of the client equipment 11 are typically "clients" in the commercial meaning of the term, of the service provider operating the first and/or second servers 10a, 10b.

B. Training the Neural Network Model

Figure 2:
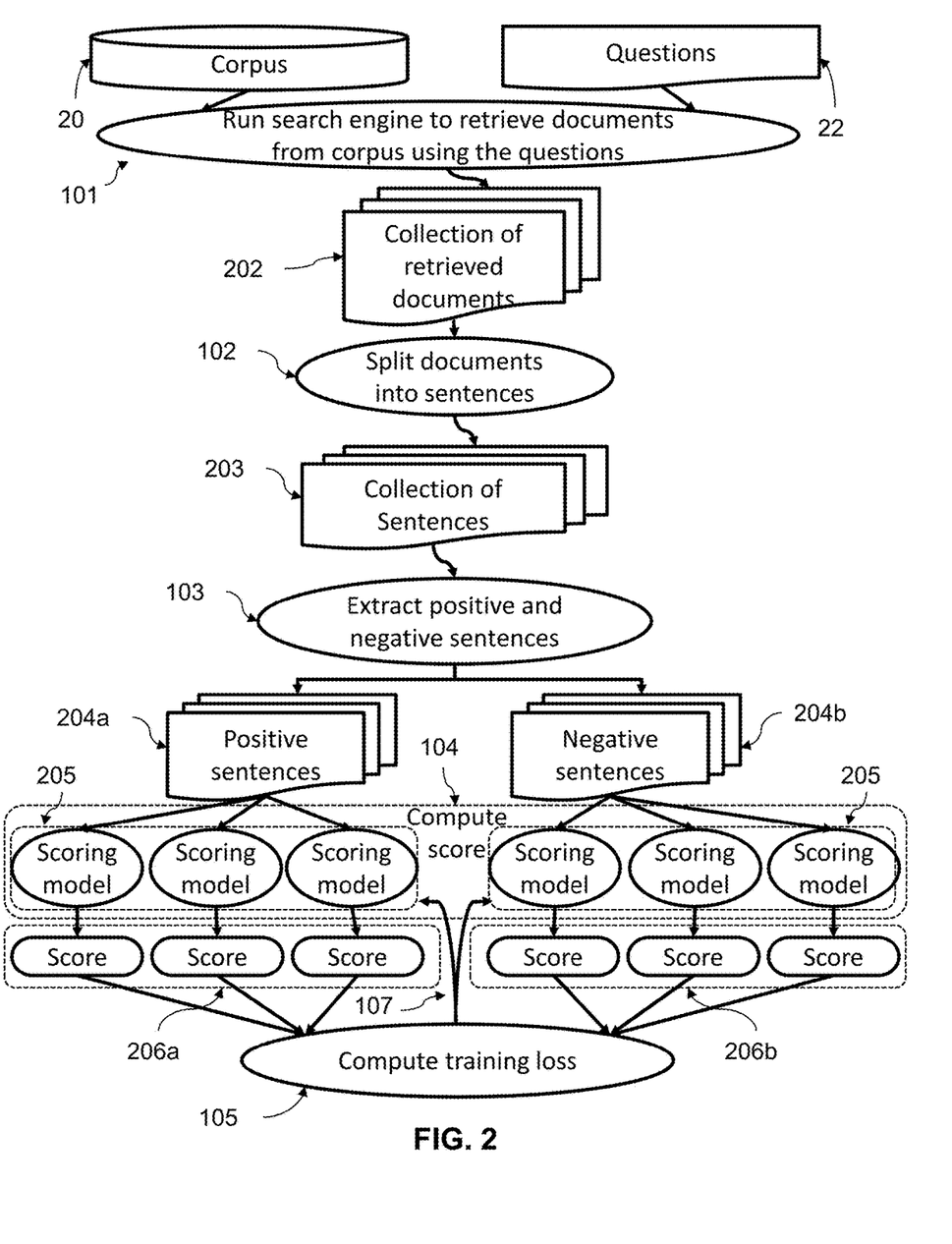
FIG. 2 is a flow diagram of a method for training a neural network model for multi-document question answering.

Referring to FIG. 2, a method for training a neural network model for question answering on multi-document corpora includes running in step 101 a search engine 24 (shown in FIG. 1) in memory 13a using, for example, the processing means 12a of server 10a. The search engine 24 retrieves a collection of documents 202 from a corpus 20 using questions (defined as queries) 22. The documents 202 retrieved from corpus 20 by the search engine are relevant to the input questions 22.

The retrieved documents 202 are then split in step 102 using the processing means 12b of the server 10b, into a collection of sentences 203, or n-grams (with a small n, for example between 2 and 4) of sentences, as a sentence is the smallest self-consistent unit of text since it is supposed to convey a coherent piece of information.

An answer sample of positive sentences 204a, or positive n-grams of sentences, are extracted from the collection of sentences 203 in step 103. These positive sentences 204a, or positive n-grams of sentences, being sentences, or n-grams of sentences, labelled as containing an answer to the given question.

An answer sample of negatives sentences 204b, or negative n-grams of sentences, randomly selected, is also extracted from the collection of sentences 203 in step 103. These negatives sentences, or negative n-grams of sentences, being sentences, or n-grams of sentences, labelled as not containing an answer to the given question.

Each of the positive sentences 204a and negative sentences 204b are then processed by the scoring model 205 (i.e., neural network model) in step 104, to compute scores 206a for positive sentences and scores 206b for negative sentences, using, for example, the processing means 12b of server 10b.

In step 105, a distance based ranking loss (i.e., training loss) is computed in using the scores of the positive sentences 204a and the negative sentences 204b. This distance based ranking loss aims at giving a higher score to sentences containing an answer to the given question than sentences not containing an answer to the given question, in order to use it to optimize the scoring model 205.

At step 107, the distance based ranking loss is used to update the scoring model 205 using a stochastic gradient descent algorithm. Examples of gradient decent algorithms include AdaGrad, RMSProp, and Adam.

With reference again to FIG. 1, in addition to the corpus 20 and the questions 22, the documents 202, sentences 203, 204a, 204b, model 205 and scores 206a, 206b may be stored, for example, using the storage means 13b of the server 10b.

C. Neural Network Model

Figure 3:
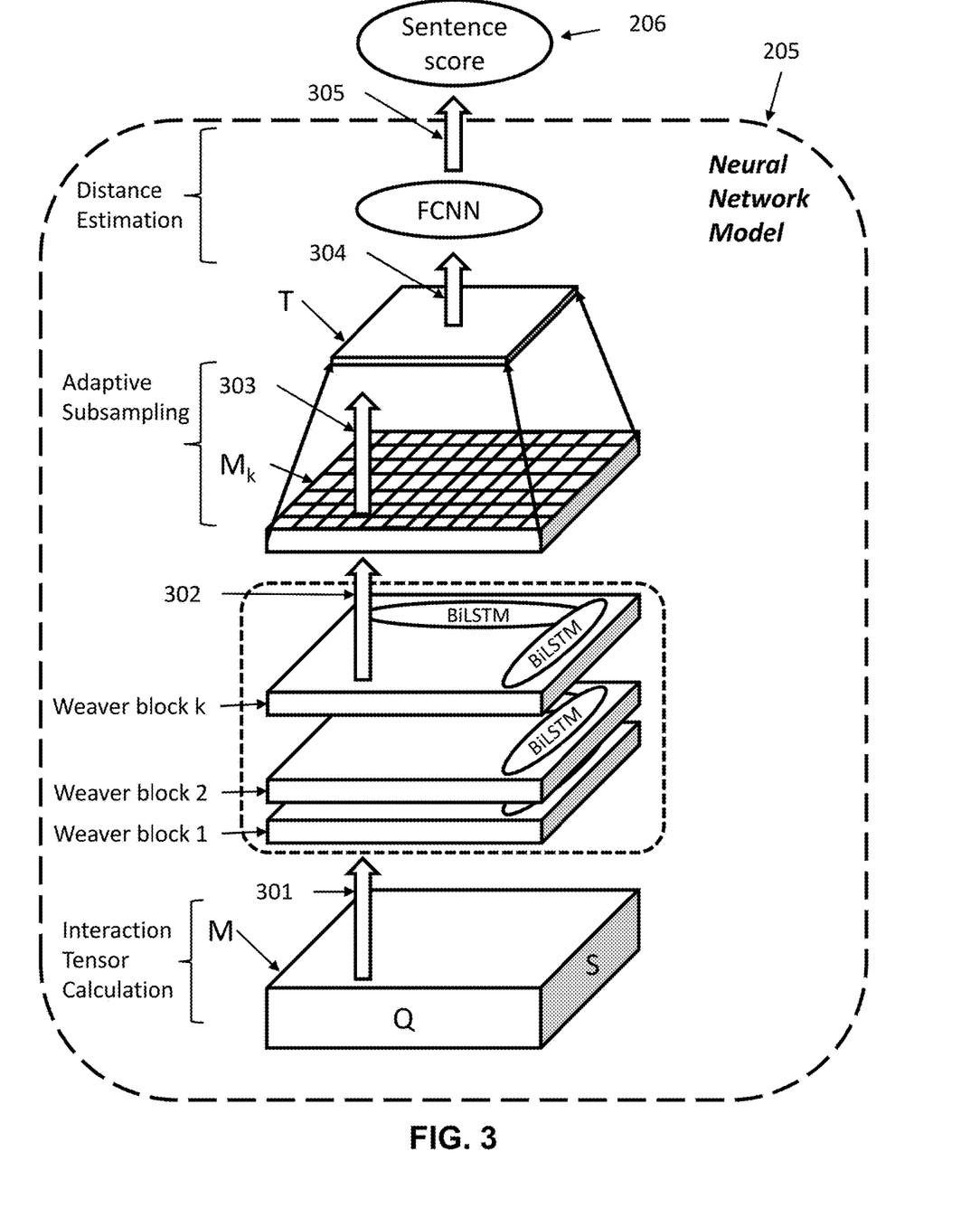
FIG. 3 illustrates in greater detail an embodiment of the neural network model trained using the method shown in FIG. 2.

FIG. 3 illustrates in greater detail an embodiment of the scoring model (i.e., neural network model) used to score sentences trained using the method shown in FIG. 2. In order to score each sentence for relevance in step 104, the input question and input sentence are tokenized using word embeddings (i.e., a set of language modeling and feature learning techniques in natural language processing where words from the vocabulary, and possibly phrases thereof, are mapped to vectors of real numbers in a low dimensional space, relative to the vocabulary size). Computation of word embedding may be done using 300-dimensional fastText embeddings, or any other method for computing word embeddings using, for example, the processing means 11a or 11b of the server 10a, respectively 1b. The embeddings for each word of the input question are gathered in a matrix $Q=[q_0, \ldots, q_n]$ where n is the number of words in the input question and $q_i$ is the i-th word of the input question, and the token embeddings for each word of the input sentence are gathered in a matrix $S=[s_0, \ldots, s_m]$ where m is the number of words in the input sentence and $q_i$ is the i-th word of the input sentence.

The scoring model in step 104 of FIG. 2 is adapted from the Weaver model for machine reading, where the answering parts are removed and a different pooling layer is added for reducing a variable-size tensor into a fixed-size tensor, which is followed by a fully connected neural network (FCNN), for example a multilayer perceptron (MLP). The Weaver model for machine reading is disclosed by Martin Raison, Pierre-Emmanuel Mazaré, Rajarshi Das, and Antoine Bordes, in "Weaver: Deep co-encoding of questions and documents for machine reading," submitted to arXiv.org on Apr. 27, 2018 (arXiv reference arXiv:1804.10490).

The input of the neural network model (i.e., scoring model) 205 is an interaction tensor M between input question matrix Q and input sentence matrix S, it may be calculated as $m_{ij}=[q_i; s_j; q_i \odot s_j]$, where:

0<i<n,

0<i<m, $u_k=u[k, :]$ for u being q or s, the operator $\odot$ represents the element-wise product, and ; represents the concatenation over the last dimension, giving a tensor having shape n×m×e, where e is the dimension of the concatenated vector $m_{ij}$. These interaction tensors may be grouped into minibatches, and are therefore padded to the sizes of the largest question and sentence in the minibatch.

The interaction tensor M is then input to a stack of k Weaver blocks in step 301 of FIG. 3. These Weaver blocks being made of two BiLSTM (Bidirectional Long Short-Term Memory) layers, each along one of the first two dimensions of the interaction tensor M. The BiLSTM hidden sizes are chosen such that input and output dimensionality are equal (except for the first layer of the first block). In step 302, the output of the last block (k-th block) is a tensor $M_k$ of shape n×m×h, where h is the output size of the last BiLSTM layer and m and n are variable depending on the size of the input interaction tensor.

After computing the Weaver blocks, the tensor $M_k$ is pooled along sentences dimensions into a fixed-size tensor T of shape t×t×h in step 303. This pooling operation is done using an adaptive subsampling layer, similar to dynamic pooling but that only performs subsampling rather than pooling by regions. Dynamic pooling is disclosed by R. Socher, E. H. Huang, J. Pennin, C. D. Manning, and A. Y. Ng, in "Dynamic pooling and unfolding recursive autoencoders for paraphrase detection," published in Advances in neural information processing systems, pp. 801-809, 2011. Since the input interaction tensors M are padded in both sentence and question dimensions to the length of the longest sentences, respectively question, in the minibatch. The subsampling on $M_k$ happens on a region corresponding to the original size, rather than the full padded size. To this end, a grid application layer such as the one originally made for Spatial Transformer Networks is used. Spatial Transformer Networks are disclosed by M. Jaderberg, K. Simonyan, A. Zisserman, et al., in "Spatial transformer networks," published in Advances inneural information processing systems, pp. 2017-2025, 2015. Output elements of this grid application layer correspond to bilinearly sampled values of grid points projected over the non-padded region of $M_k$.

In step 304, the resulting fixed size tensor T is passed into a fully connected neural network (FCNN), comprising two fully-connected layers. The hidden layer has a ReLU (Rectified Linear Unit) activation function. The last layer has an output size of one, a Sigmoid activation function and outputs an estimation of the distance between Q and S in step 305. The use of a Sigmoid activation function as the last layer allows the model to be more robust as it is a fixed range nonlinearity, since otherwise the network outputs can scale, thus making the notion of margin on the output distance lose its significance.

D. Distant Supervision

To overcome the problems of the impossibility to constitute a large-scale multi-document dataset, the disclosed method for multi-document question answering uses distant supervision.

In this disclosed method, distant supervision refers to using two different datasets: one being the question-answer datasets, containing questions and their associated answer, and the other one being the corpus information needed to answer the questions. Then, every sentence of the corpus is labelled either as positive if it contains the exact text of the answer, or negative if it does not. Of course, the fact that a sentence contains the text of the answer does not guarantee that this sentence is satisfactory for answering, but it allows a first selection to be made. Additionally, the use of distant supervision allows existing datasets to be combined in order to train a model for performing a task for which no dataset exists already.

E. Distance Based Ranking Loss

The scoring model used for the purpose of scoring sentences is essentially a distance estimation model. Thus, the task of estimating confidence that an answer concerns a given portion of text may be seen as a ranking problem in an information retrieval problem, and therefore the model may be trained with retrieval losses. To train a model in information retrieval for ranking, two common losses that may be used are the contrastive loss and the triplet loss. However, these losses are not suited for dealing with the presence of noisy labels, which is the case with distant supervision. Indeed, in the case where the answer text is present more than one time in the documents retrieved by a search engine, it may be the case that some of the sentences that contain text similar to the answer do not actually allow answering. To account for this possibility, a distance based ranking loss also called n-uplet loss may be used that takes as input all positives sentences and an equal number of sampled negatives sentences. This distance based ranking loss uses the scoring model as a distance function and aims at associating a smaller distance (i.e. scores) to input data comprising an input question and a positive sentence than to input data comprising an input question and a negative sentence.

The n-uplet loss allows the occurrence of some positives being unrelated to the query. It only requires that the best positive sentences get a better score than all negatives sentences, in other words, the n-uplet loss penalizes only the case when there exists a negative sentence that is closer to the query than all positives. Thus, given vector representations of a query Q, a list of positive sentences $S^+=\{S_i^+\}$, and a list of negative sentences $S^-=\{S_i^-\}$, with i the index of the sentence, the n-uplet loss is calculated as follows:

$$L(Q, S^+, S^-) = \sum_{S_j^- \in S^-} \max\left(0, \min_{S_i^+ \in S^+} (d_\theta(Q, S_i^+)) - d_\theta(Q, S_j^-) + \alpha\right)$$

where $d_\theta$ is the scoring model, and a is a margin parameter.

F. Runtime Use of the Neural Network Model

Figure 4:
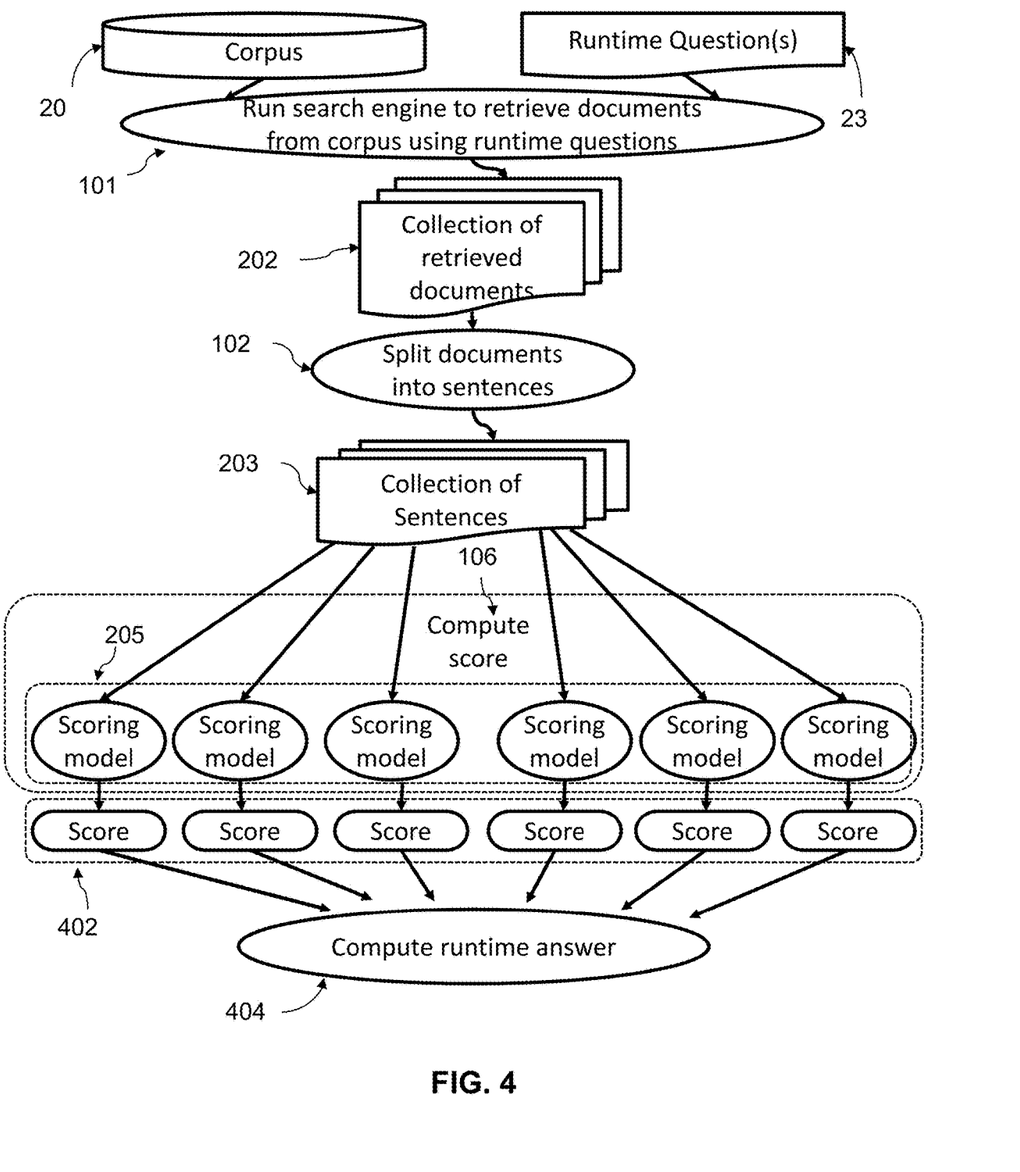
FIG. 4 is a flow diagram of a method for using the neural network trained using the method in shown FIG. 2.

FIG. 4 is a flow diagram of a runtime (or testing) method that may be performed with the system illustrated in FIG. 1 using the scoring model 205 trained in accordance with the method in FIG. 2. Generally, FIG. 4 sets forth a method for using a reader network that includes: receiving runtime question(s) 23 at server 10 from a client device 11 that may or may not concern text in corpus 20; retrieving documents 202 concerning the runtime question using search engine 24; identifying sentences 102, or more generally portions of text, in the retrieved documents; computing a runtime score 402 for the identified sentences using the neural network model 205 trained using distant supervision and distance based ranking loss; selecting the sentence corresponding to the highest score to provide an answer 404; and sending the answer to the client device 11.

More specifically, during runtime (or testing) some of the elements are the same as training; however, some are different. Similar to the training method shown in FIG. 2, during runtime a question or questions at 22 are used by search engine 24 in step 101 of FIG. 4 to query text or corpus 20 to obtain a collection of documents 202, and similarly, in step 102, the collection of documents 202 are split into a collection of sentences 203. However unlike during training time where scores 206 are computed, scores 402 are computed during runtime in step 106 for the collection of sentences 203 using the scoring model 205 (trained in accordance with the method in FIG. 2). More specifically at training time, a distance model is applied using one selected positive sentence 206a and one selected negative sentence 206b to obtain estimated distances, while at runtime the distance model 205 is applied to all candidate sentences 203 to obtain estimated distances that are used as scores 402. After computing a runtime answer in step 404 based on the sentences associated with the highest of the runtime scores computed in step 402, the predicted answer, which includes identified sentences 203 associated with the documents 202 from the corpus 20, is returned in response to the runtime question (for example, from server 10a to client equipment 11).

G. General

Accordingly, this disclosure sets forth a computer implemented method for multi-document question answering that is performed on a server (11) communicating with a client device (12) over a network (15). The method includes (A) receiving a runtime question (23) from a client device (12); (B) retrieving runtime documents (202) concerning the runtime question using a search engine (24); (C) identifying runtime answer samples (203) in the retrieved runtime documents (202); (D) computing using a neural network model (205) runtime scores (402) from runtime question data representing the runtime question (23) and from a runtime answer sample (203) representing a first portion of text from the corpus of documents (20), where each runtime score (402) represents a probability an answer to the runtime question (23) is present in the runtime answer samples (203); (E) selecting a runtime answer (404) from the runtime answer samples (203) corresponding to the highest runtime score (402); and (F) sending the runtime answer (404) to the client device.

Further the method includes training the neural network model by: (a) computing a first training score (206a) using the neural network model (205) from training question data representing a predetermined question (22) and from a first training answer sample (204a) representing a first portion of text from the corpus of documents (20), where the first training answer sample (204a) is labelled as containing an answer to the predetermined question; (b) repeating (a) for a plurality of first training answer samples (204a) which have been respectively labelled as containing an answer to the predetermined question (22) to compute a first set of training scores (206a); (c) computing a second training score (206b) using the neural network model (205) from the training question data and from a second training answer sample (204b) representing a second portion of text from the corpus of documents, where the second training answer sample (204b) is labelled as not containing an answer to the predetermined question; (d) repeating (c) for a plurality of second training answer samples (204b) which have been respectively labelled as not containing an answer to the predetermined question (22) to compute a second set of training scores (206b); (e) computing a loss using the first set of training scores and the second set of training scores by: (i) determining a minimum score among the first set of training scores (206a); (ii) for each training score in second set of training scores (206b), computing a training term that is (or depends on) a difference between the determined minimum score and each training score (206b); and (iii) summing the training terms, wherein the loss is (or depends on) the sum of the training terms; and (f) updating the neural network model (205) using the loss.

Further, this disclosure sets forth a computer implemented method in which an entry associating the predetermined question with a predetermined answer is found in a Q&A database (such as an encyclopedia database). The predetermined answer in the corpus of documents is search for using a search engine. An answer sample is labeled from the corpus of documents to be input in the neural network model: (i) as containing an answer to the predetermined question whenever the predetermined answer is found by a search engine in a portion of text, and (ii) as not containing an answer to the predetermined question whenever the predetermined answer is not found by the search engine in a portion of text. Each portion of text may be a paragraph or shorter than a paragraph, for example a sentence.

The apparatuses and methods described in this specification may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A computer implemented method for training a neural network model to compute a score representing a probability an answer to a predetermined question is present in a portion of text from a corpus of documents, the method comprising:
   (a) computing a first training score using the neural network model from training question data representing a predetermined question and from a first training answer sample representing a first portion of text from the corpus of documents, where the first training answer sample is labelled as containing an answer to the predetermined question;
   (b) repeating (a) for a plurality of first training answer samples which have been respectively labelled as containing an answer to the predetermined question to compute a first set of training scores;
   (c) computing a second training score using the neural network model from the training question data and from a second training answer sample representing a second portion of text from the corpus of documents, where the second training answer sample is labelled as not containing an answer to the predetermined question;
   (d) repeating (c) for a plurality of second training answer samples which have been respectively labelled as not containing an answer to the predetermined question to compute a second set of training scores;
   (e) computing a loss using the first set of training scores and the second set of training scores by: (i) determining a minimum score among the first set of training scores; (ii) for each training score in second set of training scores, computing a training term that is a difference between the determined minimum score and each training score; and (iii) summing the training terms, wherein the loss is the sum of the training terms; and
   (f) updating the neural network model using the loss.

2. The method of claim 1, wherein computing the second training score further comprises summing a predetermined margin and the difference between the determined minimum score and the second training score.

3. The method of claim 1, wherein the neural network model is trained with an adaptive subsampling layer configured to transform a variable size first matrix into a fixed size second matrix of a given size n×m, the size of the first matrix being greater than the size of the second matrix, the training with the adaptative subsampling layer further comprising:
   partitioning the rows, respectively the columns, of the first matrix into n, respectively m, parts; and
   subsampling one value from each partition in order to create the n×m second matrix.

4. The method of claim 1, wherein the neural network model is trained using:
   a first block comprising at least one layer;
   a second block arranged in output of the first block, and comprising an adaptative subsampling layer; and
   a fully connected neural network (FCNN) arranged in output of the second block.

5. The method of claim 4, wherein the neural network model is trained using a BiLSTM layer for at least one layer of the first block.

6. The method of claim 1, wherein the training is a distant supervision training.

7. The method of claim 1, further comprising:
   finding in a Q&A database an entry associating the predetermined question with a predetermined answer,
   searching for the predetermined answer in the corpus of documents using a search engine,
   labelling an answer sample from the corpus of documents to be input in the neural network model:
      as containing an answer to the predetermined question whenever the predetermined answer is found by a search engine in a portion of text, and
      as not containing an answer to the predetermined question whenever the predetermined answer is not found by the search engine in a portion of text.

8. The method of claim 7, wherein each portion of text is a paragraph or shorter than a paragraph, for example a sentence.

9. Method of claim 8, wherein the corpus of documents is an encyclopaedia database.

10. A computer implemented method performed on a server communicating with a client device over a network, comprising:
   (A) receiving a runtime question from a client device;
   (B) retrieving runtime documents concerning the runtime question using a search engine;
   (C) identifying runtime answer samples in the retrieved runtime documents;
   (D) computing using a neural network model runtime scores from runtime question data representing the runtime question and from a runtime answer sample representing a first portion of text from a corpus of documents, where each runtime score represents a probability an answer to the runtime question is present in the runtime answer samples;
   (E) selecting a runtime answer from the runtime answer samples corresponding to the highest runtime score; and
   (F) sending the runtime answer to the client device;
   wherein the neural network model is trained by:
   (a) computing a first training score using the neural network model from training question data representing a predetermined question and from a first training answer sample representing a first portion of text from the corpus of documents, where the first training answer sample is labelled as containing an answer to the predetermined question;
   (b) repeating (a) for a plurality of first training answer samples which have been respectively labelled as containing an answer to the predetermined question to compute a first set of training scores;
   (c) computing a second training score using the neural network model from the training question data and from a second training answer sample representing a second portion of text from the corpus of documents, where the second training answer sample is labelled as not containing an answer to the predetermined question;

(d) repeating (c) for a plurality of second training answer samples which have been respectively labelled as not containing an answer to the predetermined question to compute a second set of training scores;

(e) computing a loss using the first set of training scores and the second set of training scores by: (i) determining a minimum score among the first set of training scores; (ii) for each training score in second set of training scores, computing a training term that is a difference between the determined minimum score and each training score; and (iii) summing the training terms, wherein the loss is the sum of the training terms; and (f) updating the neural network model using the loss.

11. The method of claim 10, wherein computing the second training score further comprises summing a predetermined margin and the difference between the determined minimum score and the second training score.

12. The method of claim 10, wherein the neural network model is trained with an adaptive subsampling layer configured to transform a variable size first matrix into a fixed size second matrix of a given size nxm, the size of the first matrix being greater than the size of the second matrix, the training with the adaptative subsampling layer further comprising:

partitioning the rows, respectively the columns, of the first matrix into n, respectively m, parts; and subsampling one value from each partition in order to create the nxm second matrix.

13. The method of claim 10, wherein the neural network model is trained using:

a first block comprising at least one layer;

a second block arranged in output of the first block, and comprising the adaptative subsampling layer; and a fully connected neural network (FCNN) arranged in output of the second block.

14. The method of claim 10, wherein the neural network model is trained using a BiLSTM layer for at least one layer of the first block.

15. The method of claim 10, wherein the training is a distant supervision training.

16. The method of claim 10, further comprising:

finding in a Q&A database an entry associating the predetermined question with a predetermined answer, searching for the predetermined answer in the corpus of documents using a search engine, labelling an answer sample from the corpus of documents to be input in the neural network model:

as containing an answer to the predetermined question whenever the predetermined answer is found by a search engine in a portion of text, and as not containing an answer to the predetermined question whenever the predetermined answer is not found by the search engine in a portion of text.

17. The method of claim 16, wherein each portion of text is a paragraph or shorter than a paragraph, for example a sentence.

18. The method of claim 17, wherein the corpus of documents is an encyclopaedia database.

19. A computer implemented method for multi-document question answering, comprising:

receiving a runtime question at server from a client device;

retrieving documents concerning the runtime question using a search engine;

identifying portions of text in the retrieved documents;

computing a runtime score for the identified portions of text using a neural network model trained using distant supervision and distance based ranking loss;

selecting the portions of text corresponding to the highest score to provide an answer; and sending from the server the answer to the client device.

20. The method of claim 19, wherein computing the runtime score for the identified portions of text further comprises using the neural network model combines an interaction matrix, Weaver blocks and adaptive subsampling to map to a fixed size representation vector to scores.

* * * * *